3,306,787
FORGED METAL SHAPES, THEIR PRODUCTION, AND ARTICLES MADE THEREFROM
Kurt Dies, Bad Homburg vor der Hohe, Germany, assignor to Vereinigte Deutsche Metallwerke A.G., Frankfurt am Main-Heddernheim, Zeilweg, Germany, a corporation of Germany
No Drawing. Filed Oct. 29, 1963, Ser. No. 319,638
Claims priority, application Germany, Nov. 6, 1962, V 23,249
6 Claims. (Cl. 148—32)

Commonly, screws or rivets are used for fastening structural parts to one another, and in modern manufacturing methods welding is often used. The requirements that must be met by such bonds as regards static and dynamic characteristics and corrosion resistance are high. In the designing of welded structures, it is assumed that the structure of the material is isotropic. Consequently it has long been the practice to see to it that such a state, namely a state of the greatest randomness of the crystals, is present when the structure is to be welded, and in the case of many welding designs it is specified that the material is to be equally deformable in all directions. The test for this requirement is performed, for example, by studies of the "Zipfelbildung."

The invention relates to articles such as primary shapes or semimanufactures in the form of rods, tubes, and the like and to pressed pieces which can be die forged or are to be used for welding purposes in the form of freely formed forgings. The articles in question consist preferably of aluminum alloys. Furthermore, the invention also has to do with a process for the treatment of the alloys, or of the objects made of these alloys, in order to make them usable for welding purposes and to improve the mechanical and chemical properties required for such purposes. For example, the welds are to have at room temperature practically the same strength that is characteristic of the pieces that are welded together, allowing for the fact that the material of the shaped article or semimanufacture or workpiece undergoes no stress in some directions, while in other directions its strength characteristics are inadequate.

It is therefore proposed by the invention to give to the crystals in the articles, such as primary shapes or semimanufactures, which are to be welded together, certain preferential orientations which, in combination surprisingly prove to be especially good in their mechanical and chemical behavior after welding. It extends both to the basic material of the articles or semimanufactures and to the weld seam itself and the areas of transition from one to the other.

It has proven advantageous to start with the material in the kneaded state and to produce, in rods, shapes, tubes and die forgings, a two fold fiber texture, the (100) alignment of its one component being disposed parallel to the direction of deformation. A (533) orientation may also occur. The percentages of the two components are as different as possible, while the random crystal percentage is kept small. Preferably, the percentage of (533) orientation should predominate. It has furthermore developed that the favorable effect of the two fold fiber texture is retained when either the (533) texture or the (100) orientation is replaced by a (111) orientation. A particularly favorable preferred orientation establishes itself when the kneading is performed at high temperatures.

The aluminum alloys here involved, and which are used preferably, include those of the classes AlMgSi and AlZnMg. These alloys have preferably the following composition:

|  | Percent |
|---|---|
| Zinc | 3.5 to 6.5 |
| Magnesium | 0.8 to 3.0 |
| Copper | 0.01 to 2.0 |
| Manganese | 0.01 to 1.0 |
| Chromium | 0.01 to 0.4 |
| Beryllium | up to $5\times10^{-2}$ |
| Iron | 0.01 to 1.0 |

Balance: Aluminum, with the usual impurities up to 1%.

Also:

|  | |
|---|---|
| Magnesium | 0.5 to 1.5 |
| Silicon | 0.5 to 1.5 |
| Copper | 0.01 to 1.0 |
| Manganese | 0.01 to 1.5 |
| Chromium | 0.01 to 0.4 |
| Iron | 0.01 to 0.7 |

Balance: Aluminum 99%, with the usual impurities up to 1%.

Surprisingly, it has developed that an especially favorable effect occurs in the case of forging or kneading, as by extruding, at least 50° below the solidus curve in question, the temperatures used ranging preferably from 460 to 570° C. The optimum varies around 500±30° C.

The possibility exists of replacing the kneading in the above-mentioned temperature range, wholly or partially by an additional or common annealing in the above-mentioned temperature range, before and after the kneading. The kneadings performed in this case extend over half an hour to about 50 hours, and optimum occurring at those annealing temperatures which last longer than is generally customary, as for example 5 to 24 hours.

Thus, the invention provides a forged metal shape having a predominating crystal orientation, and, preferably, the metal is an aluminum alloy of zinc and magnesium or an aluminum alloy of magnesium and silicon. Desirably, over 10% of the crystals have a predominating orientation.

The invention further provides an article comprising two metal shapes each having a predominating crystal orientation or two or three crystal orientations according to the invention, and these shapes are welded together. The shapes joined by the welds can have substantially the same predominating orientations and the corresponding orientations of the shapes can be aligned. The weld can have the predominating orientation or orientations of the shapes and the predominating orientation or orientations of the weld extend from the corresponding orientations of the shapes.

In the production of articles having predominating crystal orientations, shapes are forged and can thereafter be solution annealed at about 490–540° C. The shapes can be and preferably are aged after forging and before the solution annealing, and are quenched after the solution annealing. Following quenching they are subjected to a low temperature annealing, e.g. 15 hours at 80° C., and 15 hours at 120° C.

The alloys or objects made thereof, which are to be used for welding purposes and have been treated by the process of the invention, exhibit, after welding, higher static and dynamic strength characteristics in the direction of stress. They have also a higher modulus of elasticity and are substantially less sensitive to corrosive attack, as for example to tension corrosion and also skin corrosion, than the articles with random crystal orientation customary hitherto.

The welding methods for joining the semimanufactures or workpieces include the usual process of cold welding, resistance welding, autogentous or electrical fusion welding, with or without gas shielding, and also spot welding and those processes in which the materials are worked by a process similar to welding, such as cutting or torch cutting.

From the semimanufactures, structural assemblies are produced which are welded to one another. These include, among others, bridge parts, load-bearing assemblies for various structures and machine parts; also, aircraft structures, rigging for ships, parts for vessels in which liquid or solid substances are to be conveyed at high or low temperatures, and floating objects of all kinds for use in fresh or salt water. The following examples will serve to explain the idea of the invention:

*Example 1*

An AlZnMg alloy of the following composition:

| | Percent |
|---|---|
| Magnesium | 1.3 |
| Zinc | 4.6 |
| Copper | 0.05 |
| Iron | 0.25 |
| Silicon | 0.25 |
| Manganese | 0.25 |
| Chromium | 0.2 |
| Titanium | 0.05 |
| Beryllium | $0.5 \times 10^{-3}$ |

Balance: Aluminum with the usual impurities up to 1%.

is extruded into round bars. After annealing same at 510° C. for a period of 15 hours, the bars are cooled and then heated within a few minutes by inductive means to a pressing temperature of 490+20° C. The kneading is done in extruding machine whose container is kept at approximately the same temperature as the bars. The extrusion ratio amounts to about 25:1. The extrusion speed is about 20 seconds per meter. The extruded shape is chilled in water immediately on leaving the die and then straightened and stretched and aged for about 3 days at room temperature. The solution treatment is now performed using a salt bath, for a period of 5 hours at 490° C. This solution treatment is followed by quenching, and then again by heat treatment in stages, in which the material is heated for 15 hours at 80° C., and then another 15 hours at 120° C., and then hardened. In this state the extruded shape exhibits a two-fold fiber texture consisting of about 60% crystal orientation (533), 30% (100) and 5% (111), and 5% random crystal orientation. This texture represents an average over the entire cross-section and length of the shape.

The crystal orientation percentages may vary somewhat between the beginning and the end of the extruded shape, and between the surface and the core of the shape. On the main axis of the fiber texture, the extruded shape has the following mechanical characteristics:

| | | |
|---|---|---|
| Yield point | kp./mm.$^2$ | 39 |
| Tensile strength | kp./mm.$^2$ | 45 |
| Elongation 5 | percent | 11 |
| Brinell hardness | kp./mm.$^2$ | 130 |
| Modulus of elasticity | kp./mm.$^2$ | 7600 |
| Notch-impact strength | mkp./cm.$^2$ | 6 |

Extruded shapes of this kind, welded by the Arganarc method, for example, are characterized by high strength in the weldment with reference to dynamic and static stresses. After 30 to 90 days of storing the weldment at room temperature, the seam has nearly the same strength as the aluminum alloy. Furthermore, in the case of corrosive environment, the welded shapes are free of skin corrosion, which, in the normal alloys results in a flaky-dough-like disintegration of the affected seam area. The parts are furthermore free of tension corrosion.

*Example 2*

An AlMgSi alloy consisting of:

| | Percent |
|---|---|
| Magnesium | 0.9 |
| Silicon | 1.0 |
| Copper | 0.05 |
| Manganese | 0.8 |
| Chromium | 0.1 |
| Titanium | 0.05 |

Balance: Aluminum, 99%, with the usual impurities up to 1%.

is extruded into a round bar, which is then annealed for 20 hours at 540° C., cooled, and heated in the induction furnace to 530° C., and extruded at 500° C. The extrusion ratio amounts to about 30:1. The extruded product is a bar. The cooling is performed immediately after extrusion by quenching in water or by means of a water-air mixture. The bar is then aged at room temperature. Then it is again heat treated for 45 minutes in a salt bath of 540 C. and quenched. The heat hardening is then performed as rapidly as possible. It can be done for example by subjecting the rod to 20 hours of heating at 160° C. The material then has the following mechanical characteristics:

| | | |
|---|---|---|
| Yield point | kp./mm.$^2$ | 40 |
| Tensile strength | kp./mm.$^2$ | 44 |
| Elongation 5 | percent | 11 |
| Brinell hardness | kp./mm.$^2$ | 128 |
| Elasticity modulus | kp./mm.$^2$ | 7800 |
| Notch impact strength | mkp./cm.$^2$ | 6 |

A crystal orientation was observed consisting of 30% (111), 50% (100), and 15% (533) double-fiber texture, and 5% random texture. After welding, the parts are further treated, if possible, by aging at room temperature or by additional annealing.

Temperatures given herein are in ° C, unless otherwise indicated. The integers in parenthesis, such as (533), (100), and (111) are Miller indices indicating crystal orientation.

What is claimed is:

1. An aluminum base alloy selected from the group consisting of aluminum alloys of zinc and magnesium and of magnesium and silicon, in forged and solution annealed condition having a two fold fiber texture in at least two predominating orientations selected from the group consisting of (533), (100), and (111), and small random orientations.

2. Aluminum base alloy according to claim 1, said predominating orientation being (533) and (100).

3. Aluminum base alloy according to claim 1, said alloy being:

| | Percent |
|---|---|
| Zinc | 3.5 to 6.5 |
| Magnesium | 0.8 to 3 |
| Copper | 0.01 to 2 |
| Manganese | 0.01 to 1 |
| Chromium | 0.01 to 0.4 |
| Beryllium | Up to $5 \times 10^{-2}$ |
| Iron | 0.01 to 1 |

Balance: Aluminum with the usual impurities up to 1%.

4. Aluminum base alloy according to claim 1, said alloy being:

| | Percent |
|---|---|
| Magnesium | 0.5 to 1.5 |
| Silicon | 0.5 to 1.5 |
| Copper | 0.01 to 1.0 |
| Manganese | 0.01 to 1.5 |
| Chromium | 0.01 to 0.4 |
| Iron | 0.01 to 0.7 |

Balance: Aluminum 99%, with the usual impurities up to 1%.

5. Aluminum base alloy according to claim 2, said alloy being:

| | Percent |
|---|---|
| Zinc | 3.5 to 6.5 |
| Magnesium | 0.8 to 3 |
| Copper | 0.01 to 2 |

| | Percent |
|---|---|
| Manganese | 0.01 to 1 |
| Chromium | 0.01 to 0.4 |
| Beryllium | Up to $5 \times 10^{-2}$ |
| Iron | 0.01 to 1 |

Balance: Aluminum with the usual impurities up to 1%.

6. Aluminum base alloy according to claim 2, said alloy being:

| | Percent |
|---|---|
| Magnesium | 0.5 to 1.5 |
| Silicon | 0.5 to 1.5 |
| Copper | 0.01 to 1.0 |
| Manganese | 0.01 to 1.5 |
| Chromium | 0.01 to 0.4 |
| Iron | 0.01 to 0.7 |

Balance: Aluminum 99%, with the usual impurities up to 1%.

References Cited by the Examiner

UNITED STATES PATENTS

| | | | |
|---|---|---|---|
| 2,522,575 | 9/1950 | Hall et al. | 148—32.5 |
| 3,042,555 | 7/1962 | George et al. | 148—32.5 |
| 3,198,676 | 8/1965 | Sprowls et al. | 148—32.5 X |

FOREIGN PATENTS

| | | |
|---|---|---|
| 434,022 | 8/1935 | Great Britain. |
| 768,097 | 2/1957 | Great Britain. |

DAVID L. RECK, *Primary Examiner.*

HYLAND BIZOT, *Examiner.*

C. N. LOVELL, *Assistant Examiner.*